US012185819B2

(12) United States Patent
Linttell

(10) Patent No.: US 12,185,819 B2
(45) Date of Patent: Jan. 7, 2025

(54) EYEBROW CONTOUR TOOL

(71) Applicant: Karen Barbara Linttell, Edmonton (CA)

(72) Inventor: Karen Barbara Linttell, Edmonton (CA)

( * ) Notice: Subject to any disclaimer, the term of this patent is extended or adjusted under 35 U.S.C. 154(b) by 99 days.

(21) Appl. No.: 17/930,470

(22) Filed: Sep. 8, 2022

(65) Prior Publication Data

US 2023/0354985 A1 Nov. 9, 2023

Related U.S. Application Data

(60) Provisional application No. 63/339,290, filed on May 6, 2022.

(51) Int. Cl.

| | |
|---|---|
| ***A45D 40/30*** | (2006.01) |
| ***B43K 17/02*** | (2006.01) |
| ***B43K 23/06*** | (2006.01) |
| ***B43K 27/04*** | (2006.01) |
| ***B43L 13/02*** | (2006.01) |

(52) U.S. Cl.

CPC .............. *A45D 40/30* (2013.01); *B43K 17/02* (2013.01); *B43K 23/06* (2013.01); *B43K 27/04* (2013.01); *B43L 13/028* (2013.01)

(58) Field of Classification Search

CPC ....... A45D 40/30; B43L 13/028; B43L 13/12; B43L 13/007; B43K 27/003; B43K 23/06; B43K 17/02; B43K 27/08

See application file for complete search history.

(56) References Cited

U.S. PATENT DOCUMENTS

| | | | | |
|---|---|---|---|---|
| 339,817 | A * | 4/1886 | Smitten .................. | B43K 17/02 15/435 |
| 4,266,343 | A * | 5/1981 | Gorelik .................. | B43K 23/00 33/41.4 |
| 5,121,552 | A * | 6/1992 | Cimador ............... | B43L 13/208 33/563 |
| 2016/0073745 | A1* | 3/2016 | Moreau .................. | F16M 13/04 24/336 |
| 2018/0304672 | A1* | 10/2018 | Mueller ................. | B43K 23/06 |

FOREIGN PATENT DOCUMENTS

JP S63116395 U * 7/1988

* cited by examiner

*Primary Examiner* — Daniel J Colilla

(57) ABSTRACT

The present invention relates to only a cosmetic tool, particularly an Eyebrow Contour Tool. The Eyebrow Contour Tool may be held in one hand, is structured to receive and hold only eyebrow makeup pencils with securing mechanisms, that is for the purpose of outlining and bounding a natural shape of an eyebrow in a symmetrical and consistent form.

3 Claims, 3 Drawing Sheets

Isometric
Assembled View

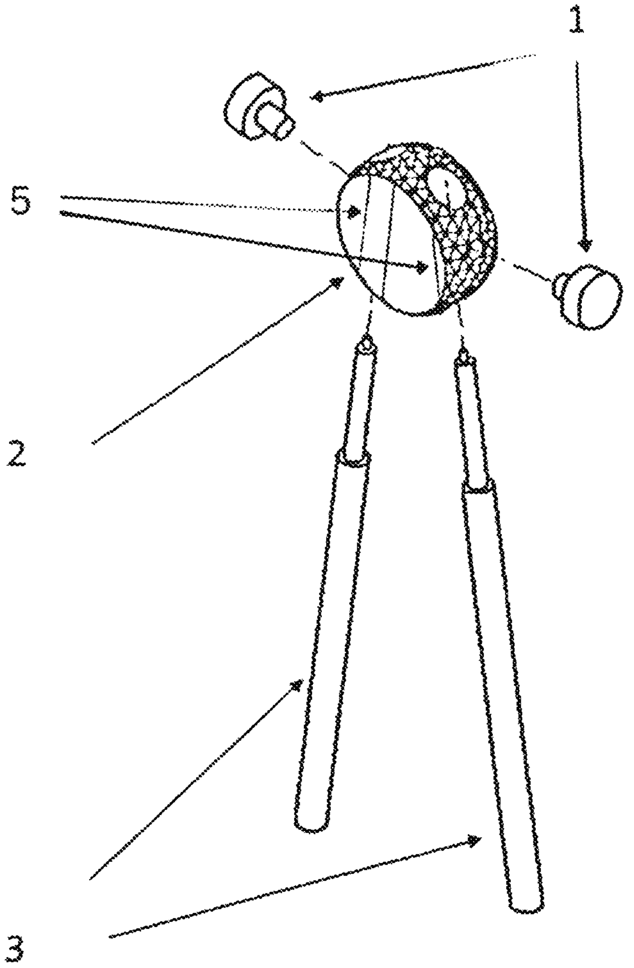
Figure 1: Isometric Exploded View

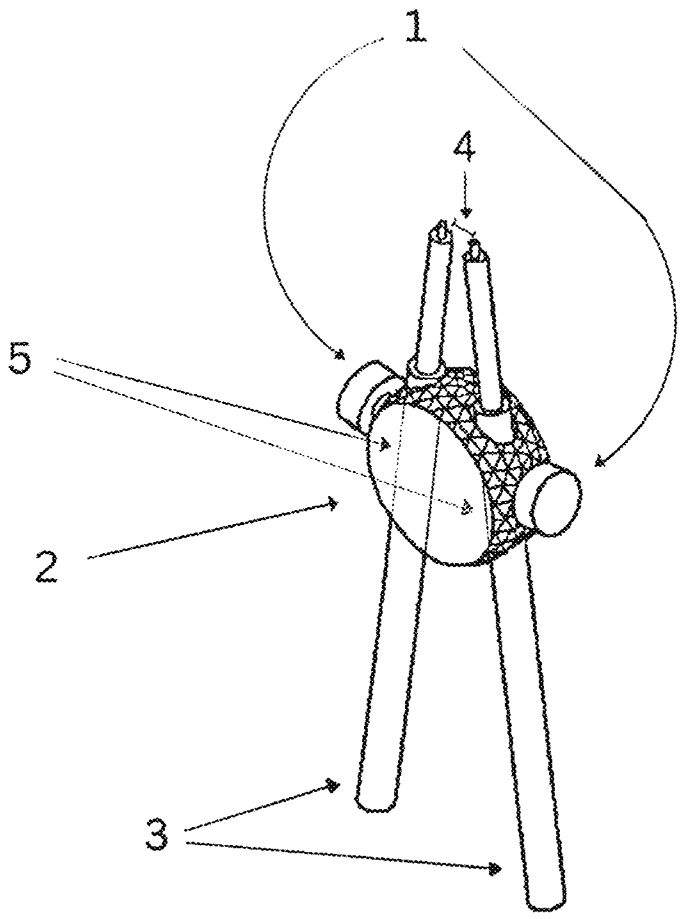
Figure 2: Isometric Assembled View

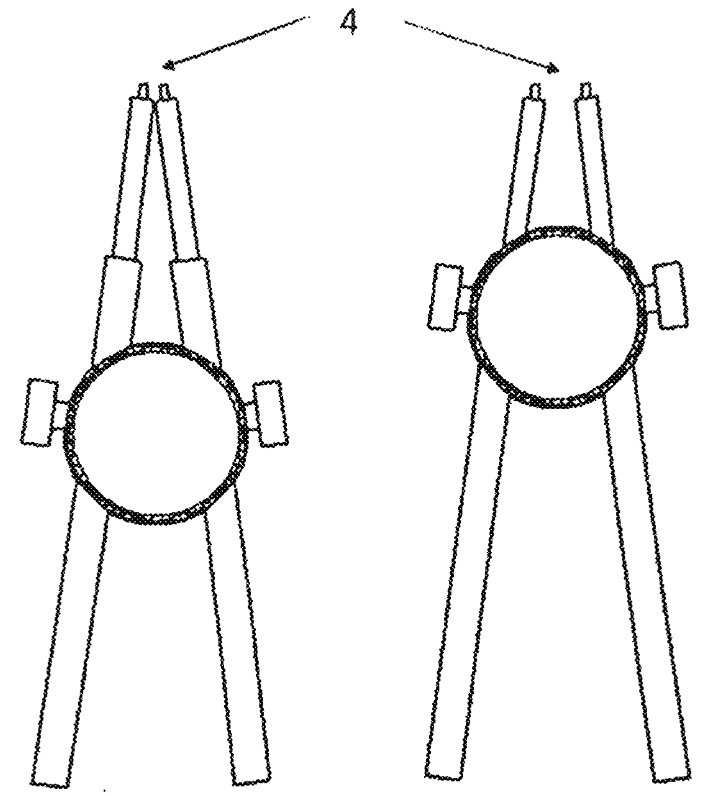
Figure 3: Front View of Two Eyebrow Contour Tools Showing Different Pencil Positions and Width of Makeup Tips

EYEBROW CONTOUR TOOL

BACKGROUND OF THE INVENTION

The invention relates to cosmetic devices in the area of eyebrow contour tools. Although there are several eyebrow tools that aid eyebrow shaping on the market (like stencils, stencil holders and measuring guides), many tools currently available are awkward to use without two hands, very time consuming and are not suited to easily follow the individuality of natural eyebrow shape. With one hand, the novel Eyebrow Contour Tool creates two consistent width of lines of eyebrow pencil makeup to create evenly contoured, symmetrical and full eyebrows in minutes. Each individual has unique width, thickness, and length of eyebrows and this tool addresses all people's unique shapes allowing the most natural contouring for optimum eyebrow shape. This novel tool allows the user to use one hand to effectively define and shape each eyebrow with consistent and equal width, following the unique natural shape of the user's eyebrows. This invention effectively allows the user to enhance what they already have for the most natural look which has not been addressed in any prior patents or patent applications.

BRIEF SUMMARY OF THE INVENTION

The invention is an Eyebrow Contour Tool that solves the following issues in eyebrow shaping: creates two lines with consistent width of eyebrow pencil makeup, creates consistent symmetrical contours on each eyebrow, and is easily held in one hand. All together, these issues have not been addressed in prior patents or patent applications. The device secures two eyebrow makeup pencils in place at a width set by user, allowing the user to use one hand while two makeup pencils simultaneously draw and evenly contour the eyebrow. The invention provides advantages especially in the field of eyebrow makeup application due to the symmetrical contours, ease of use with one hand, natural enhancement of individual eyebrows and time saving benefits.

The user secures their preferred eyebrow makeup pencils in the tool, adjusts the placement of the pencils higher or lower to determine the width of the makeup pencil tip which thus creates the width of the user's eyebrow. The Eyebrow Contour Tool, set at the user's preference width, will simultaneously line the top and bottom contours of the natural brow shape.

DETAILED DESCRIPTION OF THE INVENTION

Other objects, features and benefits of this invention will be apparent from the following description when read with reference to the accompanying drawings, FIG. 1, FIG. 2, and FIG. 3. In the drawings, wherein like reference numerals denote corresponding parts through different perspective views. The invention will be understood from the following detailed description of embodiments of the invention, which are meant to be descriptive and not limiting.

FIG. 1 is an Isometric Exploded View of an assembly according to a first embodiment of the present invention. The Eyebrow Contour Tool 2, is a small solid disk-shaped body with a pair of angled bored holes 5, configured to receive and hold only a pair of eyebrow makeup pencils 3 and has mechanisms 1 to secure (compression or tension) the pencils in place, embodying the invention. The Eyebrow Contour Tool receives and holds two eyebrow makeup pencils in place at a width set by an individual, allowing the individual to hold the disk-like structure and use one hand while two eyebrow makeup pencils simultaneously draw and contour the top and bottom lines of the eyebrow. The Eyebrow Contour Tool is directed to cosmetic tools, and more specifically, eyebrow tools.

FIG. 2 is a view similar to FIG. 1, but shows an Isometric Assembled View. The Eyebrow Contour Tool 2 is a small solid disk-shaped body with a pair of angled bored holes 5 and has a mechanism 1 to tighten or loosen the compression or tension to allow the eyebrow makeup pencils 3 to move higher or lower within the pair of angled bored holes 5 in the structure of the Eyebrow Contour Tool 2 which sets the distance of the eyebrow makeup pencil tips 4 and therefore sets the desired thickness of the user individual's eyebrows. The distance 4 is variable depending on the individual's preference of width by setting the eyebrow makeup pencils 3 in the Eyebrow Contour Tool 2 at varying positions. The eyebrow makeup pencils 3 are being held in place with compression or tension and are firmly secured within the pair of angled bored holes 5 in the structure of the Eyebrow Contour Tool. The Eyebrow Contour Tool 2, wherein the device may be easily held in one hand to create an outline representing or bounding the shape or form of the natural eyebrow for consistent, natural eyebrow shaping. At the arch of the eyebrow, the Eyebrow Contour Tool 2 may be rotated either up or down to naturally taper the width of the makeup pencil tips to create naturally thinner lines that remain consistent with the end of the natural brow shape.

FIG. 3 is a Front View of two Eyebrow Contour Tools 2 that shows the eyebrow makeup pencils 3 set at different positions to create varying width of eyebrow thicknesses with eyebrow makeup tip distance 4, showing the ability of creating alternate widths of eyebrows for different individuals.

The Eyebrow Contour Tool, is specifically configured to receive only eyebrow makeup pencils and only relates to cosmetic tools. The Eyebrow Contour Tool comprises in combination: a small solid disk-shaped body with a pair of angled bored holes and a pair of securing mechanisms wherein the pair of eyebrow makeup pencils may be received and held in place within the pair of angled bored holes, at various heights, to draw a set of simultaneous lines or defined points along the eyebrows to draw an eyebrow contour. The Eyebrow Contour Tool may be held in one hand, and reasonable to assume, between a thumb and finger, to draw an eyebrow contour with the pair of eyebrow makeup pencils.

What is claimed is:

1. An eyebrow contour tool, configured as a cosmetic tool for drawing lines on an eyebrow, configured to receive and hold only a pair of eyebrow makeup pencils, the eyebrow contour tool comprising in combination:

a small solid disk-shaped body with a pair of angled bored holes, configured to receive and hold only the pair of eyebrow makeup pencils; and a pair of securing mechanisms wherein the pair of eyebrow makeup pencils may be received and held in place within the pair of angled bored holes, at various heights to set a width between tips of the eyebrow makeup pencils in the pair of eyebrow makeup pencils, wherein the eyebrow contour tool is configured to draw a set of simultaneous lines or defined points along the eyebrow to draw an eyebrow contour.

2. The eyebrow contour tool, according to claim 1, wherein:

the small solid disk-shaped structure is made of a solid material and is configured to be held in one hand within a thumb and finger, while the set of two simultaneous lines or points are created to draw the eyebrow contour.

3. The eyebrow contour tool, according to claim 2, wherein the small disk-shaped structure is configured to not impede vision while being held up to the eyebrows while applying the eyebrow makeup pencils held in the eyebrow contour tool; and wherein the pair of eyebrow makeup pencils are fixed in the pair of angled bored holes by the pair of securing mechanisms so that there is no movement of the pair of eyebrow makeup pencils while pressure is applied when holding the eyebrow contour tool while the eyebrow makeup pencils draw the eyebrow contour.

* * * * *